United States Patent [19]

Regnier et al.

[11] Patent Number: 4,920,152

[45] Date of Patent: Apr. 24, 1990

[54] REVERSED-PHASE PACKING MATERIAL AND METHOD

[75] Inventors: Frederick E. Regnier, West Lafayette, Ind.; William Kopaciewicz, Ipswich, Mass.

[73] Assignee: Purdue Research Foundation, West Layfayette, Ind.

[21] Appl. No.: 862,750

[22] Filed: May 13, 1986

[51] Int. Cl.$^5$ .......................... C08F 8/46; B01D 15/08
[52] U.S. Cl. ........................................ 521/31; 521/28; 210/656
[58] Field of Search ........................... 521/28; 529/424

[56] References Cited

U.S. PATENT DOCUMENTS

| | | | |
|---|---|---|---|
| 3,538,024 | 11/1970 | Dichbruger et al. | 528/424 |
| 3,951,815 | 4/1976 | Wrasidlo | 528/424 |
| 4,245,005 | 1/1981 | Regnier et al. | 428/420 |
| 4,544,485 | 10/1985 | Pinkerton et al. | 210/502.1 |
| 4,551,245 | 11/1985 | Ramsden et al. | 210/198.2 |
| 4,560,704 | 12/1985 | Regnier | 521/31 |
| 4,675,384 | 6/1987 | Dromard et al. | 530/364 |

FOREIGN PATENT DOCUMENTS 0121468 10/1984 European Pat. Off. .

*Primary Examiner*—Joseph L. Schofer
*Assistant Examiner*—Peter F. Kulkosky
*Attorney, Agent, or Firm*—Stacey L. Channing; William L. Baker

[57] ABSTRACT

Reversed-phase materials and a method for producing such materials are disclosed. In making the materials, first a thin layer of an adsorbate comprising reactive amine groups is adsorbed to a support material such as silica, alumina or titania. A portion of the reactive amine groups of said adsorbed coating are then reacted with an amount of a hydrophobic reagent sufficient to effect crosslinking of said coating. At least one remaining reactive amine group, and preferably all of the reactive amine groups of said crosslinked adsorbed coating, are then reacted, preferably in the presence of a proton scavenger, with an amount of a hydrophobic anhydride sufficient to form an amide bond with said reactive amine.

41 Claims, 4 Drawing Sheets

REVERSED-PHASE PACKING MATERIAL AND METHOD

BACKGROUND OF THE INVENTION

This invention relates to reversed-phase materials and methods for producing the same and more particularly relates to hydrophobic reversed-phase materials that are particularly well suited as packing materials for reversed-phase chromatography.

High performance reversed-phase chromatography has become a powerful tool for the isolation of natural and synthetic polypeptides. With the development of efficient wide pore macroparticulate media and mobile phases capable of dissolving large denatured polypeptides, peptide fragments can be isolated in sufficient purity for sequence analysis.

The stationary phases most commonly used in silica-based reversed-phase chromatography columns are straight chain alkanes of 4 to 18 carbon atoms. These alkyl ligands are covalently coupled to silanol groups on the silica surface by reaction with an alkylchlorosilane to form a siloxane bond. However, due to steric limitations, the addition of bulky alkyl silane groups at the silica surface is not quantitative and a number of free silanols remain. These residual hydroxyl moieties may be partially sequestered in a second end capping reaction with chloromethylsilanes.

Recent work has shown that in the reversed-phase chromatography of some membrane proteins, the addition of 40 to 60% formic acid to the mobile phase is required to solubilize these very hydrophobic polypeptides. The use of strongly acidic mobile phases presents a problem with the current generation of silica-based reversed-phase chromatography columns. Since the Si-C bond is more susceptible to attack by electrophiles than a C-C bond, strong acids, e.g. formic acid, can gradually cleave the Si-C bond between the silica support and the stationary phase.

Previous work by Alpert and Regnier with adsorbed polyethyleneimine chemistry as discussed in U.S. Pat. No. 4,245,005, the teachings of which are incorporated herein by reference, has shown it to be extremely versatile for the synthesis of anion-exchange stationary phases. Utilizing the existing adsorption technology pioneered by Alpert and Regnier for the synthesis of adsorbed polymeric anion-exchange media, reversed-phase materials of the invention have been produced.

SUMMARY OF THE INVENTION

This invention provides reversed-phase materials and a method of producing such materials. The reversed-phase materials of the invention are well suited as chromatographic packing materials for the separation of proteins, polypeptides and other polymers.

In making the reversed-phase materials, first a thin layer of adsorbate comprising reactive primary and/or secondary amine groups, such as polyethyleneimine, is adsorbed to an inorganic support material such as silica, alumina or titania. Amine groups of said adsorbed coating are then reacted with an amount of a hydrophobic reagent sufficient to effect crosslinking of said coating. If the hydrophobic reagent employed is capable of crosslinking said coating while in turn rendering surface amines neutral at acidic pH, then all the reactive amines of the adsorbed coating are preferably reacted with said hydrophobic reagent. If the hydrophobic reagent employed is not capable of crosslinking said coating and only leaving neutral surface functionalities, then the hydrophobic reagent is used in an amount that will convert no more than 30%, and more preferably no more than 10%, of the reactive primary and secondary amines of said adsorbed coating to tertiary amines. At least one unreacted amine group and preferably all the remaining reactive primary and secondary amine groups of said crosslinked adsorbed coating are then reacted with a reagent that will render said amines neutral at acidic pH. One example of such a reagent is an anhydride. An anhydride will convert the reactive amine to an amide which is neutral.

Accordingly, it is a principal object of this invention to provide a reversed-phase material that is acid stable and reproducible.

It is a further object of this invention to provide such a reversed-phase material that has excellent chromatographic characteristics.

It is yet another object of this invention to provide such a reversed-phase material that is simple and inexpensive to produce.

DETAILED DESCRIPTION OF THE INVENTION

This invention is particularly directed towards preparing reversed-phase materials that are particularly well suited as packing material for the separation of proteins, peptides and other polymers in reversed-phase chromatography.

In making the reversed-phase materials, as in U.S. Pat. No. 4,245,005, the surface of a support material having an affinity for an adsorbate is contacted with an adsorbate comprising reactive primary and/or secondary amine groups such that a pellicular coating of said adsorbate is adsorbed to said surface by electrostatic forces. The adsorbate is preferably included in a solvent and adsorption can be partially established by controlling the polarity of said solvent. The less polar the solvent, the stronger the adsorption. The preferred solvent is methanol. Other suitable solvents include dimethylformamide and dioxane acetonitrile. The adsorbate includes at least two functional groups, one of which interacts with the surface of the support material to cause adsorption thereof and the other of which is used for crosslinking. Suitable adsorbates of the invention are polyethyleneimine, 1,3-diamino-2-hydroxypropane, tetraethylenepentamine, and ethylenediamine. The preferred adsorbate of the invention contains very few, if any, tertiary amines since tertiary amines (which are protonated and consequently, positively charged at acidic eluent pH) convey hydrophilic character to the reversed-phase materials.

The support material is preferably an inorganic support material such as silica, alumina and titania with the preferred support material being silica. Specific examples of suitable inorganic support materials are LiChrospher Si 500 (10-micron particle diameter), LiChrosorb Si 100 (10-micron particle diameter), LiChrospher Si 100 (10-micron particle diameter) Chromosorb LC-6, Partisil 10, Vydac TPB, controlled pore glass (5–10 micron particle diameter; 100 Å pore diameter), Spherisorb alumina (10-micron particle diameter; 150 Å pore diameter), Bio-Rad basic alumina, Activity 1 (40-micron particle diameter), Bio-Rad acid alumina, Activity 1 (40-micron particle diameter), Corning titania (40/60 mesh; pore diameter=400 Å), Amicon Matrex ® silica gels, zirconyl clad silica (a zirconium coating on Vydac TPB silica), and magnesium oxide.

After a pellicular coating of an adsorbate comprising reactive primary and/or secondary amine groups is adsorbed to the surface of the support material, said reactive amine groups of said adsorbed coating are reacted with an amount of a hydrophobic reagent sufficient to effect crosslinking of said coating. If the hydrophobic reagent employed is capable of reacting with said amine groups to crosslink said coating while in turn rendering said amines neutral at acidic pH, then all the reactive primary and secondary amines of the adsorbed coating are preferably reacted with said hydrophobic reagent.

If the hydrophobic reagent employed is not capable of crosslinking said coating while in turn rendering the amines neutral at acidic pH, then the hydrophobic reagent is employed in an amount sufficient to react with only a portion of the reactive primary and/or secondary amine groups of said adsorbed coating, is preferably employed in an amount that will convert no more than 30% of the reactive primary and/or secondary amines of said adsorbed coating to tertiary amines, and is most preferably employed in an amount that will convert no more than 10% of the reactive primary and/or secondary amines of said coating to tertiary amines. Hydrophobic reagents of this type suitable for crosslinking the coating include alkyl halides, such as alkyl bromides, alkyl chlorides and alkyl iodides; and epoxy resins such as a polyfunctional epoxy resin having the formula:

wherein R comprises a hydrophobic organic radical such as aryl or alkyl and more preferably having the formula:

If, after the adsorbed coating is crosslinked, there are reactive primary and/or secondary amine groups remaining in the crosslinked adsorbed coating, then at least one said amine group, more preferably many of said amine groups, and most preferably all of said amine groups are reacted with a reagent, preferably hydrophobic, that will render said amines neutral at acidic pH. An example of a reagent that will render said amines neutral at acidic pH is a reagent that will convert wherein $R_1$ is an organic radical and $R_2$ is O or a member of an aromatic ring containing $R_1$. One such reagent is an anhydride. An anhydride will form amide bonds, which are neutral, with said amines. For instance, at least one remaining reactive amine group, more preferably many remaining reactive amine groups, and most preferably all the remaining reactive primary and secondary amine groups of the crosslinked adsorbed coating may be reacted, preferably in the presence of a proton scavenger and preferably in a dry aprotic solvent such as dimethylformamide, with an amount of anhydride sufficient to form amide bonds with said reactive amines. The proton scavenger preferably comprises a tertiary amine and more preferably comprises diisopropylethylamine. The anhydride, which is preferably hydrophobic, has the general formula:

wherein $R_1$ and $R_2$, which may be the same or different, comprise organic radicals and more preferably comprise organic radicals selected from the group consisting of alkyl containing from 1 to 20 carbon atoms, phenyl, diphenyl, napthyl etc. Suitable anhydrides include benzoic anhydride, stearic anhydride, hexanoic anhydride and octanoic anhydride. Besides anhydride, another example of a reagent that will react with the remaining reactive amines of the crosslinked adsorbed coating to render the amines neutral at acidic pH is cyanuric chloride.

The invention is further illustrated by the following non-limiting examples.

EXAMPLE 1

One gram of Vydac 101TPB 5.5 μm (spherical, 330 Å) silica was suspended in 10 ml of a methanolic 1% (w/v) polyethyleneimine-6 (average molecular weight=600) solution. The suspension was degassed, agitated and allowed to stand for 30 minutes at room temperature. The silica was then isolated in a sintered glass funnel and dried. The adsorbed coating was then crosslinked into a pellicle by transferring it to a flask containing 10 ml of a 5% (v/v) EPON 828 (a bisphenyl diepoxide having the structure:

-obtained from Polyscience, Inc.) solution in methanol, degassing, agitating, and allowing the suspension to stand overnight at room temperature. At the end of this period, the flask was heated over steam for 30 minutes. The coated, crosslinked silica was isolated in a sintered glass funnel, washed with methanol and placed in an oven at 100° C. for one hour. Although this coated, crosslinked silica was sufficiently hydrophobic to be nonwettable, chromatography of a protein test mixture using a 0.46×5 cm column packed with approximately 500 mg of this material was unacceptable. Apparently, amines in the coating (which are protonated and, consequently, positively charged at acidic eluent pH) convey sufficient hydrophilic character to the packing material that proteins are not strongly retained.

Figure 1:
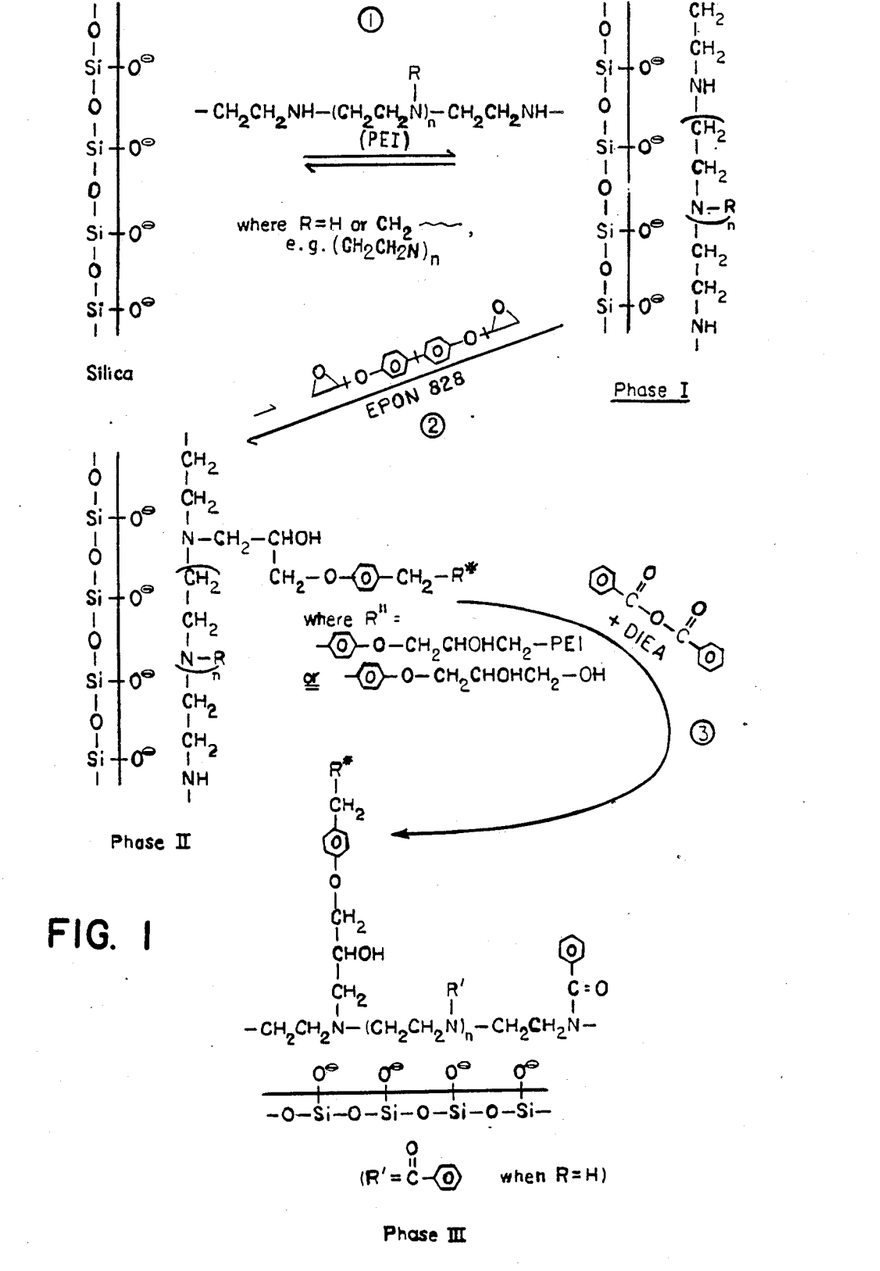
FIG. 1 is a schematic diagram illustrating a reaction scheme of the invention.

In an effort to render the coated, crosslinked silica more hydrophobic, residual primary and secondary amines were acylated by transferring the coated, crosslinked silica to a flask containing 5 ml dry dimethylformamide, 400 mg benzoic anhydride and 250 µl diisopropylethylamine (DIEA). This reaction simultaneously adds phenyl groups and eliminates amines through amide bond formation. DIEA was added as a proton scavenger since an acid which could titrate adjacent amines (rendering them unreactive) is produced during the reaction of the anhydride and the coated, crosslinked silica. After degassing and agitation, this suspension was heated in an oil bath at 60° C. overnight. The benzoylated, polyamine-coated silica was isolated in a sintered glass funnel, washed thoroughly with methanol and dried in a vacuum dessicator. Acylation of residual primary and secondary amines in the crosslinked coating served to simultaneously reduce positive charge and introduce additional hydrophobicity. Benzoic anhydride was used for acylation so that the group added would be consistent with the structure of EPON 828. Unfortunately, tertiary amines initially present in polyethyleneimine and those generated during the crosslinking step will remain in the coating, since those moieties cannot be acylated. A schematic diagram illustrating the reaction scheme for the adsorbed PEI reversed-phase material of this Example is shown in FIG. 1. The Arabic numerals denote reaction steps and the Roman numerals denote reaction products.

EXAMPLE 2

Elemental analysis of the hydrophobic adsorbed polyethyleneimine (PEI) coating material of Example 1 (PEI-Phenyl) indicated a 12% carbon load. (See Table 1).

TABLE 1

| Packing Material | Elemental Analysis Data | | | |
|---|---|---|---|---|
| | C (%) | C[1] (%) | Net loss[2] (mgC/g Support) | Total mass lost (%) |
| SynChropak RP-8 | 2.8 | 1.04 | 1.76 | 63.0 |
| PEI-Phenyl | 12.0 | 11.6 | 0.4 | 3.3 |

[1]Analysis of media after treatment with 40% formic acid for 24 hrs at 60° C.
[2]Obtained by subtracting the carbon content after formic acid treatment from the initial carbon load.

This carbon loading is substantially higher than the 2.8% obtained with SynChropak RP-8 silica (a commercial organosilane bonded reversed-phase media obtained from SynChrom, Inc., Linden, I.N.). These results suggest that the PEI-Phenyl coating is thicker. Although increased layer thickness may add stability to the coating, it also consumes pore volume and surface area. Acid resistance of the PEI-Phenyl and SynChropak RP-8 packing materials was investigated by placing 50 mg of each material in 5 ml of 40% aqueous (v/v) formic acid to which a few drops of dimethylformamide had been added as a wetting agent. After heating for 24 hours at 60° C., the two test samples were reisolated on a sintered glass filter, thoroughly washed with dimethylformamide and then with acetone, and dried in a dessicator. Elemental carbon analysis showed this formic acid treatment to cause a 63% loss of the bonded phase from the Synchropak RP-8 media while only 3.3% was removed from the PEI-Phenyl coated media (Table I). These results suggest that extended operation of organosilane reversed-phase columns under strongly acidic conditions will result in substantial loss of bonded phase from the support. By contrast, adsorbed coatings in which the organic phase contains only C-C or C-N bonds are much more acid resistant. Increased acid resistance of the PEI-Phenyl material would allow the use of strongly acidic mobile phases in chromatography without fear of stripping the bonded phase. Furthermore, such acids could be used routinely for column cleanup and depyrogenation.

EXAMPLE 3

50 mg of the PEI-Phenyl material of Example 1 was assayed for its capacity to bind picric acid (Table II).

TABLE II

Comparison of the PEI-Phenyl Silica to SynChropak RP-8 Media

| Packing Material | IPC[1] (umol amine/g) | $L_c$, BSA[2] (mg/g) | $t_R$, BSA (min) | $R_s$ (BSA/OVA) |
|---|---|---|---|---|
| SynChropak RP-8 | | 169 | 15.4 | 2.9 |
| PEI-Phenyl | 170 | 84 | 11.0 | 2.8 |

[1]Picric acid ion-pairing capacity.
[2]Static loading capacity of bovine serum albumin per gram coated silica.

Picric acid ion pairs with accessible amines but not with amides. The picric acid assay indicated that the PEI-Phenyl coating contained 170 µmoles of ion-pairable amines per gram of silica (Table II) corresponding to 2.2 µmoles of amine per $m^2$. A Varian 634 UV-visible spectrophotometer (Varian, Walnut Creek, C.A.) was used to measure picric acid concentrations.

EXAMPLE 4

50 mg of the PEI-Phenyl material of Example 1 and 50 mg of SynChropak RP-8 media were each assayed for their ability to bind bovine serum albumin (BSA) by a hydrophobic adsorption mechanism. A 10 mg/ml solution of BSA was made in 0.1% trifluoroacetic acid using a few drops of acetonitrile to render the hydrophobic particles wettable. This solution was then added to both samples of the PEI-Phenyl material and SynChropak RP-8 media. The samples were allowed to set for 15 minutes to ensure complete adsorption. The BSA was then desorbed from the different medias using 60% acetonitrile in 0.1% trifluoroacetic acid. The results of the BSA binding assay are given in Table II. A Varian 634 UV-visible Spectrophotometer was used to determine concentrations in the BSA binding assay. The PEI-Phenyl material bound less BSA than the SynChropak RP-8 material and this might be due to the fact that the PEI-Phenyl coating appears to be thicker, thus consuming pore volume and surface area.

EXAMPLE 5

Approximately 500 mg each of the PEI-Phenyl material of Example 1 and the SynChropak RP-8 material were packed into individual 0.41×5 cm ID columns for the isocratic chromatography of small molecules. These columns were then used for the chromatography of 10 μg samples each of benzylamine, phenylethanol and benzoic acid. Chromatography was performed (with an LDC Constametric I and III G system with Gradient Master obtained from Laboratory Data Control, Rivera Beach, Fla.) using as an eluent a 1:9 methanol:water solution (pH7) at a 0.5 ml/min flow rate. The retention of phenylethanol in 100% methanol was used as $t_o$. $k'$ was determined by the formula:

$$k' = (t_R - t_o)/t_o$$

where $t_R$ is the solute retention time and $t_o$ is the void time. As expected, benzylamine was preferably retained on the SynChropak RP-8 column, probably as the result of silanol interactions (Table III).

TABLE III

| Packing | Isocratic Chromatography of Small Molecules k' | | |
|---|---|---|---|
| Material | Benzylamine | Phenylethanol | Benzoic acid |
| SynChropak RP-8 | 2.93 | 0.12 | 0 |
| PEI-Phenyl | 0.27 | 0.52 | 5.97 |

Phenylethanol was weakly retained on both columns (Table III). Benzoic acid was preferentially retained on the PEI-Phenyl column apparently due to the interaction of the carboxylic acid with residual tertiary amines in the bonded phase (Table III). At neutral pH, the residual charge in the column and its sign are indicated by the exaggerated retention characteristics of either the aromatic base or acid.

EXAMPLE 6

Figure 2:
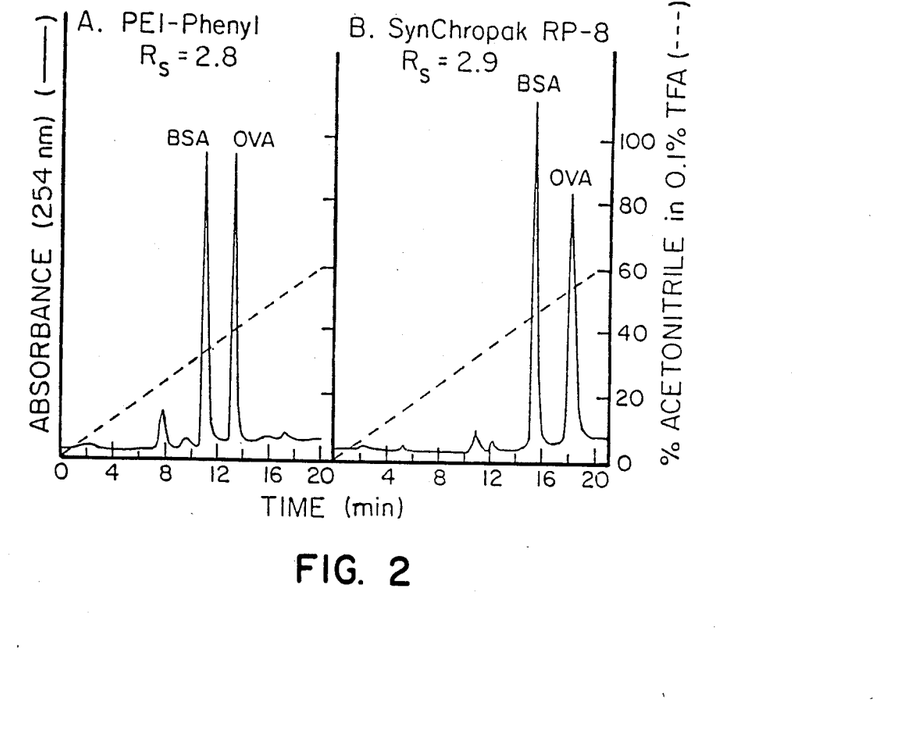
FIGS. 2A and 2B are graphs illustrating the chromatographic evaluation of two reversed-phase columns based on the separation of an ovalbumin-bovine serum albumin protein mixture.

An analytical test sample consisting of 140 μg ovalbumin (OVA) and 100 μg bovine serum albumin (BSA) was chromatographed on both the PEI-Phenyl and SynChropak RP-8 columns of Example 5 using the chromatography instrumentation of Example 5 and using as an eluent a 20 minute linear gradient from 0.1% trifluoroacetic acid to 60% acetonitrile in 0.1% trifluoroacetic acid at a flow rate of 1 ml/min. Detection was at $A_{254}$ monitored by a Spectroflow 773 detector (Kratos, Ramsey, N.J.). The retention time ($t_R$) of the OVA and BSA peaks are given in Table II and shown graphically in FIG. 2. Resolution ($R_s$ in Table II and FIG. 2) between OVA and BSA was calculated according to the equation:

$$R_s = 2(t_{R2} - t_{R1})/(\Delta t_{R1} + \Delta t_{R2})$$

The symbols $t_{R1}$ and $t_{R2}$ are the retention times of each peak, while $\Delta t_{R1}$ and $\Delta t_{R2}$ are the peak widths. The subscripts 1 and 2 refer to the first and second peak to elute from the column. On the basis of selectivity and resolution, the SynChropak RP-8 and the PEI-Phenyl columns were essentially equivalent for the separation of ovalbumin and bovine serum albumin. However, the PEI-Phenyl column was less retentive as both proteins eluted several minutes earlier than on the RP-8 media. Since the surface density of phenyl groups on the adsorbed PEI-Phenyl coating appears to be greater than the alkylsilane density of the SynChropak RP-8 coating, decreased retention probably results from the greater polarity of the phenyl ligand. Reduced retention may be advantageous with large polypeptides that have limited solubility in organic solvents. Specifically, elution may be achieved at a lower organic solvent concentration. In cases where it is disadvantageous, decreased retention may be circumvented by the use of a more hydrophobic ion-pairing agent (e.g. heptafluorobutyric acid).

EXAMPLE 7

Figure 3:
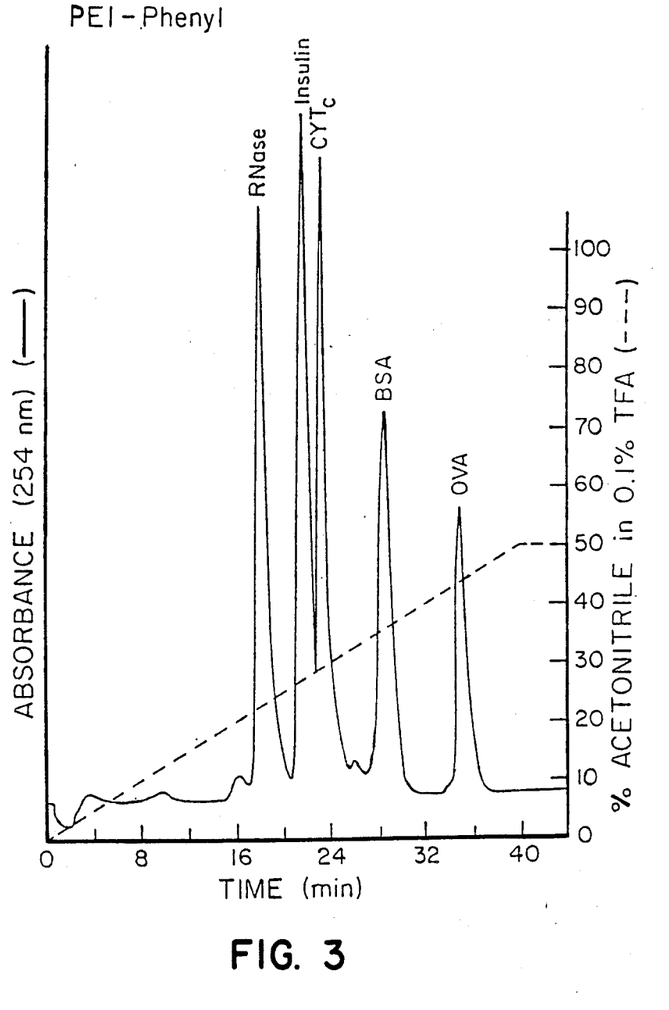
FIG. 3 is a graph illustrating the chromatographic evaluation of a reversed-phase column based on the separation of a ribonuclease-insulin-cytochrome c-bovine serum albumin-ovalbumin protein mixture.

An analytical test sample consisting of 75 μg ribonuclease (RNase), 75 μg insulin, 40 μg cytochrome c (CYTc), 75 μg BSA and 125 μg OVA was chromatographed on the PEI-Phenyl column of example 5 using the chromatography and detection apparatus of Example 6 and using a 40 minute linear gradient from 0.1% trifluoroacetic acid to 50% acetonitrile in 0.1% trifluoroacetic acid at a 0.5 ml/min flow rate as an eluent. The results of the chromatographic separation are shown graphically in FIG. 3.

EXAMPLE 8

Figure 4:
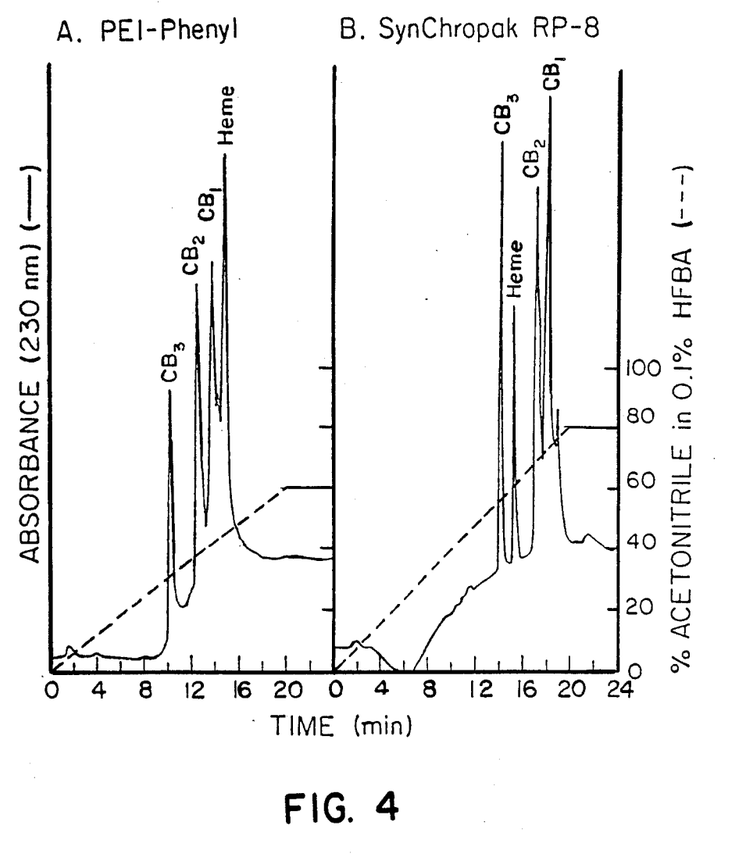
FIGS. 4A and 4B are graphs illustrating the chromatographic evaluation of two reversed-phase columns based on the separation of sperm whale myoglobin cyanogen bromide digest.

Sperm whale myoglobin cyanogen bromide digest was prepared by cleaving sperm whale myoglobin with cyanogen bromide. Myoglobin, which contains two methionine residues and a heme, yields 3 peptide fragments ($CB_1$-residues 1-55, $CB_2$-residues 56-131, and $CB_3$-residues 132-153) and a porphyrin ring. An analytical test sample consisting of 300 μg of the sperm whale myoglobin cyanogen bromide digest was chromatographed on both the PEI-Phenyl and SynChropak RP-8 columns of Example 5 using the chromatography instrumentation of Example 5 and using as an eluent a 20 minute linear gradient from 0.1% heptafluorobutyric acid (HFBA) to 60% or 80% acetonitrile in 0.1% HFBA at a 1 ml/min flow rate. Heptafluorobutyric acid was used as the ion-pairing agent in this case because TFA provided insufficient retention on the PEI-Phenyl column. Detection was at $A_{230}$ monitored by a Spectroflow 773 detector. The results of the chromatographic separation are shown graphically in FIG. 4. Both the PEI-Phenyl column and the SynChropak RP-8 column exhibited good resolution and retention characteristics in separating the major sample components. The PEI-Phenyl packing material was again less retentive requiring only 50% acetonitrile to elute the last peak, while 80% acetonitrile was needed on the RP-8 column. Interestingly, the PEI-Phenyl support offered a slightly different selectivity for chromatography of the heme moiety. It eluted as the second peak from the RP-8 column and as the last peak from the PEI-Phenyl column. The delayed elution probably resulted from stacking interactions between aromatic groups of the PEI-Phenyl material and the porphyrin ring.

While this invention has been described with reference to its preferred embodiment, other embodiments can achieve the same result. Variations and modifications of the present invention will be obvious to those skilled in the art and it is intended to cover in the appended claims all such modifications and equivalents as fall within the spirit and scope of this invention.

We claim:

1. A process for producing a reversed-phase material comprising the steps of:
   (a) providing a support material having a surface with an affinity for an adsorbate;

(b) contacting the surface of said support material with an adsorbate comprising reactive primary and/or secondary amine groups such that a pellicular coating of said adsorbate is adsorbed to said surface by electrostatic forces;

(c) crosslinking said adsorbed coating by reacting a portion of said reactive amine groups of said coating with a first hydrophobic reagent; and (d) producing a reversed-phase material by reacting at least one remaining reactive amine group of said crosslinked adsorbed coating with an amount of a second hydrophobic reagent sufficient to render the amine neutral at acidic pH.

2. The process of claim 1 wherein said support material is an inorganic support material selected from the group consisting of silica, alumina and titania.

3. The process of claim 1 wherein said adsorbate contains few, if any, tertiary amines.

4. The process of claim 1 wherein said adsorbate is selected from the group consisting of polyethyleneimine, 1,3-diamino-2-hydroxypropane, tetraethylenepentaimine, and ethylenediamine.

5. The process of claim 1 wherein said adsorbate is included in a solvent and wherein adsorption is at least partially established by controlling the polarity of said solvent.

6. The process of claim 1 wherein in step c, the amount of first hydrophobic reagent used does not convert more than 30% of said reactive amines of said adsorbed coating to tertiary amines.

7. The process of claim 6 wherein in step c, the amount of first hydrophobic reagent used does not convert more than 10% of said reactive amines of said adsorbed coating to tertiary amines.

8. The process of claim 1 wherein the first hydrophobic reagent is selected from the group consisting of epoxy resins, alkyl bromides, alkyl chlorides and alkyl iodides.

9. The process of claim 8 wherein said first hydrophobic reagent comprises a polyfunctional epoxy resin.

10. The process of claim 9 wherein said epoxy resin has the formula:

11. The process of claim 1 wherein in step d, substantially all the remaining reactive amine groups of said crosslinked adsorbed coating are reacted with an amount of a second hydrophobic reagent sufficient to render said amines neutral at acidic pH.

12. The process of claim 1 wherein in step d, the at least one remaining reactive amine group of said crosslinked adsorbed coating is reacted with an amount of an anhydride sufficient to form an amide bond with said amine, said anhydride having the formula:

wherein $R_1$ and $R_2$ comprise organic radicals.

13. The process of claim 12 wherein in step d, substantially all the remaining reactive amine groups of said crosslinked adsorbed coating are reacted with an amount of said anhydride sufficient to form amide bonds with said amines.

14. The process of claim 12 wherein a proton scavenger comprising a tertiary amine is added to the reaction of amine with anhydride.

15. The process of claim 13 wherein a proton scavenger comprising a tertiary amine is added to the reaction of amine with anhydride.

16. The process of claim 14 wherein the proton scavenger comprises diisopropylethylamine.

17. The process of claim 12 wherein $R_1$ and $R_2$ can be the same or different and $R_1$ and $R_2$ are selected from the group consisting of alkyl containing up to 20 carbon atoms, phenyl, diphenyl and naphthyl.

18. A process for producing a reversed-phase material comprising the steps of:
(a) providing a silica support material having a surface with an affinity for an adsorbate;
(b) contacting the surface of said support material with an adsorbate comprising polyethyleneimine such that a pellicular coating of said adsorbate is adsorbed to said surface by electrostatic forces;
(c) reacting a portion of the reactive amine groups of said adsorbed coating with an amount of bisphenyl difunctional epoxide sufficient to effect crosslinking of said coating; and
(d) producing a reversed-phase material by reacting remaining amine groups of said crosslinked adsorbed coating with an amount of benzoic anhydride sufficient to form amide bonds with said amines.

19. A process for producing a reversed-phase material comprising the steps of:
(a) providing a support material having a surface with an affinity for an adsorbate;
(b) contacting the surface of said support material with an adsorbate comprising reactive primary and/or secondary amine groups such that a pellicular coating of said adsorbate is adsorbed to said surface by electrostatic forces; and
(c) reacting said amine groups of said adsorbed coating with an amount of a hydrophobic reagent sufficient to crosslink said coating while rendering said amines neutral at acidic pH.

20. The process of claim 19 wherein said support material is an inorganic support material selected from the group consisting of silica, alumina and titania.

21. The process of claim 19 wherein said adsorbate contains few, if any, tertiary amines.

22. The process of claim 19 wherein said adsorbate is included in a solvent and wherein adsorption is at least partially established by controlling the polarity of said solvent.

23. A reversed-phase support material produced by the steps of:
(a) providing a support material having a surface with an affinity for an adsorbate;
(b) contacting the surface of said support material with an adsorbate comprising reactive primary and/or secondary amine groups such that a pellicular coating of said adsorbate is adsorbed to said surface by electrostatic forces;
(c) crosslinking said adsorbed coating by reacting a portion of said reactive amine groups of said coating with a first hydrophobic reagent; and
(d) reacting at least one remaining reactive amine group of said crosslinked adsorbed coating with an amount of a second hydrophobic reagent sufficient to render the amine neutral at acidic pH.

24. The reversed-phase material of claim 23 wherein said support material is an inorganic support material selected from the group consisting of silica, alumina and titania.

25. The reversed-phase material of claim 23 wherein said adsorbate contains few, if any, tertiary amines.

26. The reversed-phase material of claim 23 wherein said adsorbate is selected from the group consisting of polyethyleneimine, 1,3-diamino-2-hydroxypropane, tetraethylenepentaimine, and ethylenediamine.

27. The reversed-phase material of claim 23 wherein said adsorbate is included in a solvent and wherein adsorption is at least partially established by controlling the polarity of said solvent.

28. The reversed-phase material of claim 23 wherein in step c, the amount of first hydrophobic reagent used does not convert more than 30% of said reactive amines of said adsorbed coating to tertiary amines.

29. The reversed-phase material of claim 23 wherein the first hydrophobic reagent comprises a polyfunctional epoxy resin.

30. The reversed-phase material of claim 29 wherein said epoxy resin has the formula:

31. The reversed-phase material of claim 23 wherein in step d, substantially all the remaining reactive amine groups of said crosslinked adsorbed coating are reacted with an amount of a second hydrophobic reagent sufficient to render said amines neutral at acidic pH.

32. The reversed-phase material of claim 23 wherein in step d, the at least one remaining reactive amine group of said crosslinked adsorbed coating is reacted with an amount of an anhydride sufficient to form an amide bond with said amine, said anhydride having the formula:

wherein $R_1$ and $R_2$ comprise organic radicals.

33. The reversed-phase material of claim 32 wherein in step d, substantially all the remaining reactive amine groups of said crosslinked adsorbed coating are reacted with an amount of said anhydride sufficient to form amide bonds with said amines.

34. The reversed-phase material of claim 32 wherein a proton scavenger comprising a tertiary amine is added to the reaction of amine with anhydride.

35. The reversed-phase material of claim 32 wherein $R_1$ and $R_2$ can be the same or different and $R_1$ and $R_2$ are selected from the group consisting of alkyl containing up to 20 carbon atoms, phenyl, diphenyl and naphthyl.

36. A reversed-phase material produced by the steps of:
(a) providing a support material having a surface with an affinity for an adsorbate;
(b) contacting the surface of said support material with an adsorbate comprising reactive primary and/or secondary amine groups such that a pellicular coating of said adsorbate is adsorbed to said surface by electrostatic forces; and
(c) reacting said amine groups of said adsorbed coating with an amount of a hydrophobic reagent sufficient to crosslink said coating while rendering said amines neutral at acidic pH.

37. The reversed-phase material of claim 36 wherein said adsorbate contains few, if any, tertiary amines.

38. The process of claim 1 further comprising the steps of:
(e) packing the reversed-phase material into a chromatographic column; and
(f) chromatographing a test sample on said column using an appropriate eluent.

39. The process of claim 38 wherein the test sample comprises a mixture of proteins, polypeptides or other polymers.

40. The process of claim 1 wherein in step d, many of the remaining reactive amine groups of said crosslinked adsorbed coating are reacted with an amount of a second hydrophobic reagent sufficient to render said amines neutral at acidic pH.

41. The reversed-phase material of claim 23 wherein in step d, many of the remaining reactive amine groups of said crosslinked adsorbed coating are reacted with an amount of a second hydrophobic reagent sufficient to render said amines neutral at acidic pH.

* * * * *